US007526357B2

(12) United States Patent
Livingston et al.

(10) Patent No.: US 7,526,357 B2
(45) Date of Patent: Apr. 28, 2009

(54) PULSE MODULATION LASER WRITING SYSTEM

(75) Inventors: Frank Edward Livingston, Hermosa Beach, CA (US); Henry Helvajian, Pasadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 793 days.

(21) Appl. No.: 11/010,878

(22) Filed: Dec. 13, 2004

(65) Prior Publication Data

US 2006/0126477 A1    Jun. 15, 2006

(51) Int. Cl.
*G11B 7/00* (2006.01)
(52) U.S. Cl. .................... 700/166; 438/689
(58) Field of Classification Search .......... 700/116, 700/123, 166; 430/322, 945; 438/257, 114, 438/689; 257/676
See application file for complete search history.

(56) References Cited

U.S. PATENT DOCUMENTS

| | | | |
|---|---|---|---|
| 5,628,926 A * | 5/1997 | Belgacem et al. | 219/121.71 |
| 6,675,453 B2 * | 1/2004 | Briggs | 29/401.1 |
| 7,065,121 B2 * | 6/2006 | Filgas et al. | 372/64 |
| 2003/0161375 A1 * | 8/2003 | Filgas et al. | 372/66 |
| 2004/0031779 A1 * | 2/2004 | Cahill et al. | 219/121.83 |
| 2005/0018738 A1 * | 1/2005 | Duan et al. | 372/55 |

OTHER PUBLICATIONS

Povolotskiy et al., 2D and 3D Laser Writing for Intergrated Optical Elements Creation, Laser Research Institute., 2002.*

* cited by examiner

*Primary Examiner*—Kidest Bahta
(74) *Attorney, Agent, or Firm*—Derrick Michael Reid

(57) ABSTRACT

A pulse modulation laser writing system generates a motion control file for controlled motion of a sample under modulated laser beam exposure and generates a laser script file for generating a sequence of laser writing processes, such as, ablation, welding, texturing, and dosing, the sample while under motion control. The system enables laser writing processing of complex multimaterial samples in a single manufacturing process.

12 Claims, 4 Drawing Sheets

PULSE MODULATION LASER WRITING SYSTEM

PULSE MODULATION LASER WRITING SYSTEM

MULTIMATERIAL SAMPLE

MODULATED PULSE SCRIPT

| PROCESS | LASER PULSE STRUCTURE |
|---|---|
| ABLATION | ıl\|lı  ıl\|lı  ıl\|lı  ıl\|lı |
| WELDING | ıl\|\|\|  ıl\|\|\|  ıl\|\|\|  ıl\|\|\|  ıl\|\|\| |
| TEXTURING | \|  \|  \|  \|  \|  \| |
| DOSING | \|\|\|\|\|ııııı\|\|\|\|\|ıııııı\|\|\|\|\|ıııııı\|\|\|\|\| |

SCRIPTED LASER WRITING PROCESSES

FIG. 4

PULSE MODULATION LASER WRITING SYSTEM

FIELD OF THE INVENTION

The invention relates to the field of laser microfabrication and patterning of glass ceramic materials such as described in U.S. Pat. No. 6,783,920 issued Aug. 31, 2004. More particularly, the present invention relates to the manufacture of structure within photoactivable glasses and ceramics using variable laser exposures having predetermined laser exposure scripts. The invention also relates to the manufacture of structure on the surfaces or in the embedded interiors of other materials including metals, polymers, dielectrics and biological systems.

BACKGROUND OF THE INVENTION

Lasers or other light sources have the unique property of delivering precise photonic energy at a distance. As a consequence, laser processing is becoming widely used in manufacturing because laser processing can provide a tool that is physically non-intrusive to the part undergoing the processing. Lasers or photolytic processing methods have the additional feature of processing material on a local scale, which reduces material waste with improved safety. Lasers or photolytic processing techniques retain the advantage of processing many different types of materials, such as metals, glass, ceramics, polymers, semiconductors, bioceramics, bone, and tissue, with a scale resolution that can approach the wavelength of light. With these advantages, a laser or photon material process can cost effectively be applied to precision laser milling manufacturing. Usefulness of a laser and photonic processing method is dependent on the precision and control that is exercised during photon delivery to the target sample. Photonic processing can have multidimensional control. As a result, there is a wider diversity of processes that are possible with lasers and light. Laser processes can be used to remove material with very high precision, aid in the deposition of materials, alter the phase of processed materials, or act as a spectroscopic monitor during processing.

Lasers or optical processing approaches can facilitate the development of advanced components and devices. However, the disadvantages of laser material processing have been the inability to modulate the photon flux with sufficient fidelity to produce the desired physical outcome. This lack of systems control has limited the application of lasers to materials processing. Laser processing relies on necessary laser controls, such as, power, intensity, temporal intensity distribution, spatial intensity distribution, and coherence, for the material sample under irradiation at optimum times. For a target that is not moving, this is easily accomplished. However, when the target is moving and patterns are being laser machined, the current methods involve fixing the laser power and then applying the necessary controls to minimize the power fluctuations. This rudimentary type of control does not compensate for motion when the target velocity is varying continuously. Consequently, the sample is overexposed or overmachined in areas where the velocity was less than the average value. For example, this overexposure would occur at locations where sharp turns of the sample target or the laser beam are made. The laser processing industry solves this over and under exposure problem by adding a laser beam shutter and using cut-in and cut-out segments within the tool path pattern that are similar to operations performed on a milling machine. The cut-in and cut-out segments are additional motion segments that permit the motion control system to ramp-up and ramp-down the velocity. The laser beam is shuttered on and off during these additional segments. This cut-in and cut-out approach adds overhead to the processing time and limits the types of motion sequences. Furthermore, it becomes difficult to machine a part that is comprised of an assortment of materials that are co-joined or a part that has an assortment of surface finishes. To machine such a part, the laser power would be reset or altered as the laser repeatedly traverses the different materials and different surface finishes. This type of reset power control is not available and as a consequence laser machining is now conducted on individual material types and finishes and then post-assembled. Significant costs are involved in complex manufacturing using laser-processing methods applied to an assembled unit that is comprised of many materials and surface finishes. These and other disadvantages are solved or reduced using the invention.

SUMMARY OF THE INVENTION

An object of the invention is to provide a system for laser machining multimaterial samples.

Another object of the invention is to provide a system for machining samples by laser writing processes such as ablation, welding, texturing, and dosing.

Yet another object of the invention is to provide a system for generating a laser writing script for generating a modulated laser beam.

Still another object of the invention is to provide a system for laser machining multimaterial samples using a laser writing script for generating a modulated laser beam.

A further object of the invention is to provide a system for enabling laser write processes such as ablation, welding, texturing, and dosing using a laser writing script for generating a modulated laser beam.

Yet a further object of the invention is to provide a system for laser machining a multimaterial sample using laser write processes such as ablation, welding, texturing, and dosing, and using a laser writing script for generating a modulated laser beam exposing the multimaterial sample under concurrent motion control.

The present invention is directed toward a pulse modulated laser writing system for patterning samples using a laser writing script for generating a modulated laser beam that is applied to multimaterial samples using various laser writing processes, such as, ablation, welding, texturing, and dosing. The system provides for the controlled delivery of laser photons to the processing surface. The modulated laser beam can be generated for the particular material type, such as, metal, dielectric, wood, and plastic, as well as the surface finish, such as, rough, smooth, and textured. The system is useful for laser patterning of the sample when moving under motion control as the sample surface is under laser-scripted irradiation. For example, the scripted modulated laser beam can be applied to a patchwork quilt of variant materials of a single multimaterial sample, that require different laser-write processing for differing material types. The system can ensure that every laser-irradiated spot will receive exactly the photon dose and intensity pulse sequence necessary to complete the desired laser writing processes across an entire multimaterial sample.

A laser exposure script file and a motion control file are generated for laser machining the multimaterial sample. A sequence of concatenated laser writing processes define the laser exposure script for performing a sequence of laser writing processes or machining functions, while concurrently, the sample is moved under control of the motion control file. The system achieves laser material processing by using a fast electrooptic shutter for modulating the laser beam of pulses. A waveform generator is used to synthesize electrical waveform signals for generating a laser writing process that can then be modulated by the shutter control unit so that the modulated laser beam is a series of modulated pulses conforming to the electrical waveforms. Tool path generator software can be used for generating the controlled motion file and the laser script file for processing a predetermined multimaterial sample for providing fine control during laser material processing especially during periods of changing velocities of the sample being moved under the modulating and machining laser beam. As such, the system enables precise laser machining of samples including multimaterial samples having various portions requiring differing respective types of laser modulations and waveforms to achieve the various machining functions upon the entire sample in a single manufacturing process.

In advance of laser writing, sample measurements can be conducted on the various materials and surfaces to determine the optimum laser parameters. These parameters may be the photonic dose in photons per unit area, intensity in power per unit area, fluence in energy per unit area, as well as a pulse repetition rate, for the machining the sample to possess the desired photophysical and photochemical properties. These measurements are performed on individual material samples. The results of the measurements can be recorded for later use on various samples having a material determined by the measurement. The results of these measurements comprise a genotype that is a set of information and instructions that describe how to achieve a desired photophysical and photochemical property. Many factors are used in generating the laser script, such as the laser wavelength. For example, the laser pulses can be a sequence of multiple laser pulses each at different amplitude or a continuously varying photon flux. The system provides automatic laser processing using laser writing scripts for efficient manufacture of the samples, such as a multimaterial sample. The laser writing script is synchronized with the motion control file so that the correct laser writing process is delivered to the sample at the correct location and time in the presence of changing velocities of the sample. These and other advantages will become more apparent from the following detailed description of the preferred embodiment.

BRIEF DESCRIPTION OF THE DRAWINGS

FIG. 4 depicts scripted laser writing processes.

DETAILED DESCRIPTION OF THE PREFERRED EMBODIMENT

Figure 1:
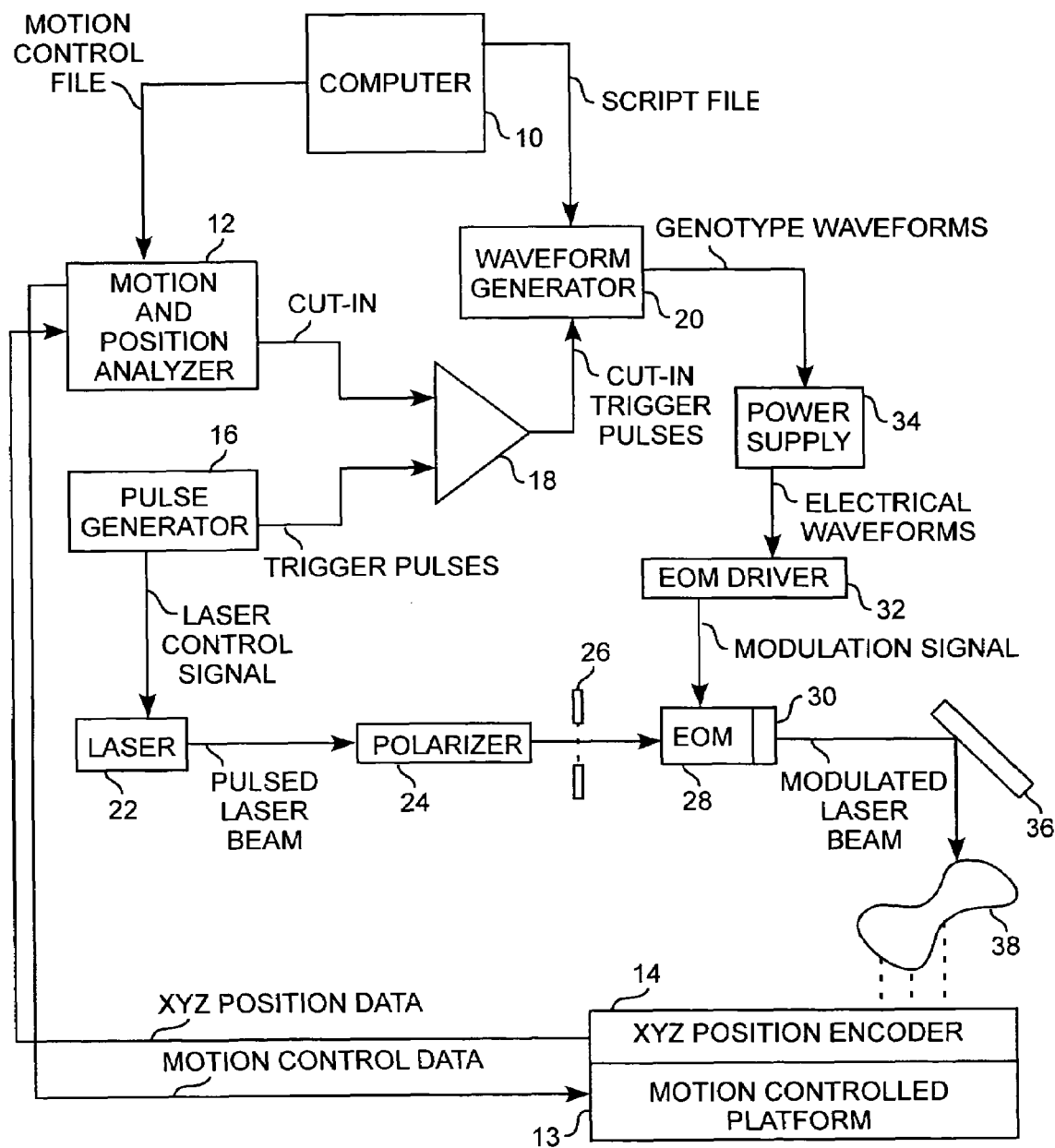
FIG. 1 is a block diagram of pulse modulation laser writing system.

An embodiment of the invention is described with reference to the figures using reference designations as shown in the figures. Referring to FIG. 1, a pulse modulated laser writing system includes a computer 10 for generating a laser script file and a motion control file. The control file can be a tool path file delineated in computer numerical control (CNC) program code. The motion control file is fed to the motion and position analyzer 12 for generating motion control data. The analyzer 12 functions as a motion controller of the platform and position synchronizer for synchronizing the motion to laser writing processes. The motion control data is fed to a motion-controlled platform 13 for synchronously moving the platform 13 with the script file. The platform 13 is coupled to an XYZ position encoder 14 for providing XYZ position data to the motion and position analyzer 12. The motion and position analyzer 12 may be a three-axis motion control system. The XYZ position data is encoder data of the actual position of the platform 13 at a given time. A pulse generator 16 provides trigger pulses to both a comparator 18 and a laser 22. The motion and position analyzer provides a cut-in signal to the comparator 18. The comparator 18 generates cut-in trigger pulses during cut-in times, but not the cut-out times. The cut-in time duration is a time of laser write processing. The cut-in trigger pulses are communicated through the comparator 18 to a waveform generator 20 that also receives or has stored the script file for generating the next genotype waveform. The waveform generator 20 may be a commercially available arbitrary waveform signal generator. Concurrently, the pulse generator 16 also provides a laser pulse control signal to a laser 22 generating a pulsed laser beam. The laser could be a continuous wave laser that is turned on and off by the laser control signal. The pulsed laser beam is communicated through a polarizer 24 that polarizes the pulsed laser beam into a polarized pulsed laser beam. The pulsed laser beam is then fed through a pinhole iris 26 for spatial filtering of the pulsed laser beam into a collimated pulse laser beam that is a spatially filtered and polarized laser beam. The collimated pulsed laser beam is communicated to an electrooptical modulator (EOM) 28 having an output polarizer 30 for providing a modulated laser beam. The modulator 28 may be an electrooptic Pockels cell that is a device used for ultrafast laser shuttering operations by modulating the laser beam polarization. Concurrently, the genotype waveforms from the waveform generator 20 are communicated to a power supply 34 for providing electrical waveforms to an EOM driver 32. The power supply 34 may be a power supply and amplifier for supplying power and for amplifying the genotype waveforms. The driver 32 provides a modulation control signal to the electrooptical modulator 28 that modulates the collimated pulsed laser beam into the modulated laser beam. The modulated laser beam may then be processed through optics 36 such as mirrors and lenses necessary to deliver and focus the modulated laser beam onto the multimaterial sample 38. The sample 38 is rigidly mounted onto the platform 13 for moving the sample 38 as the sample 38 is exposed to the modulated laser beam and for perfecting laser write processes upon the sample 38.

Figure 2:
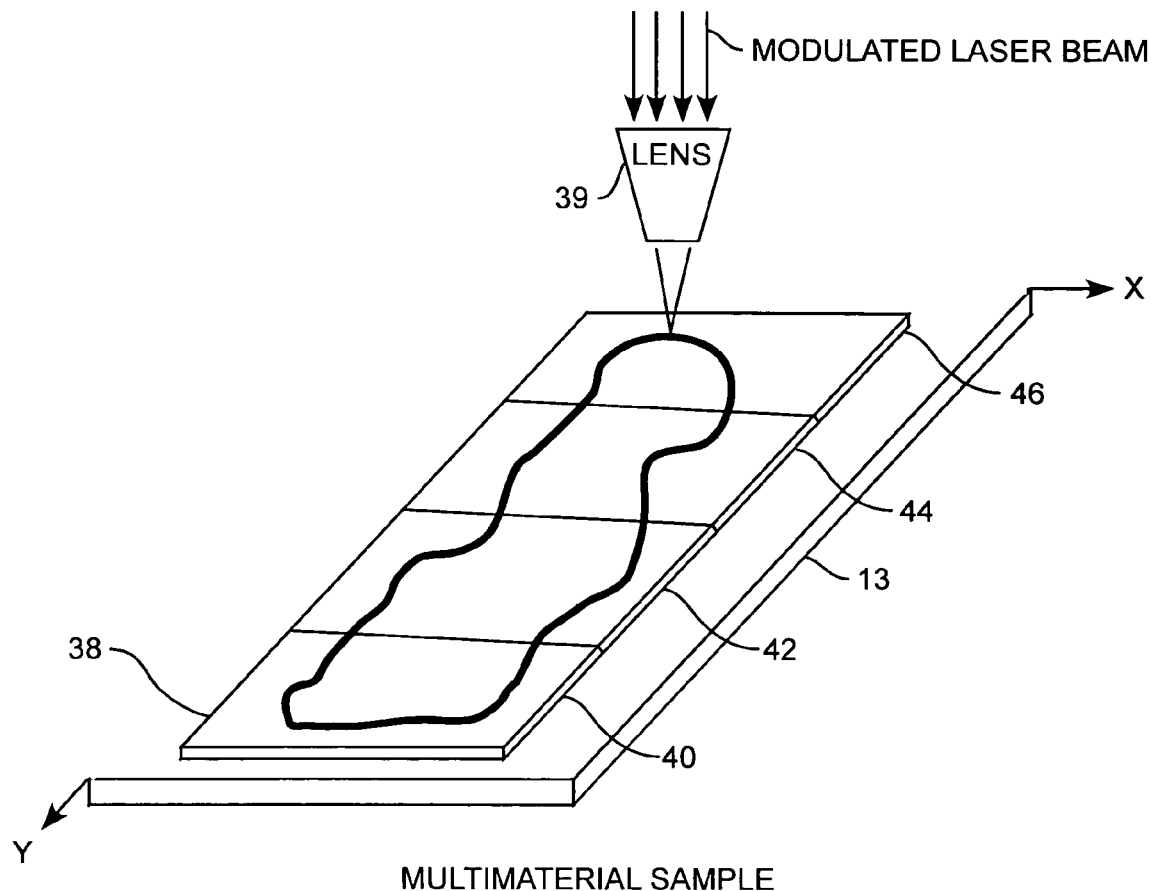
FIG. 2 depicts a multiple genotype sample.
Figure 3:
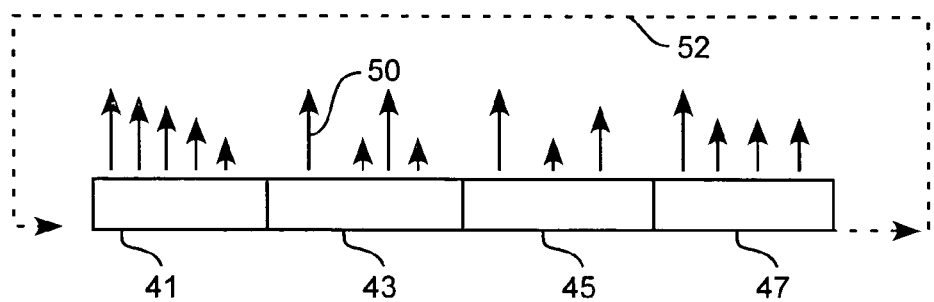
FIG. 3 depicts a modulated pulse script.

Referring to FIGS. 1, 2, and 3, and more particularly to FIGS. 2 and 3, the modulated laser beam is processed through desired optics, such as a lens 39 for focusing and delivering a focus modulated laser beam onto the multimaterial sample 38. The sample 38 may include, for example, four sample portions 40, 42, 44, and 46, each being exposed to a respective genotype waveform 41, 43, 45, and 47, that collectively form a modulated pulse script of pulses 50. The modulated laser beam delivers the modulated pulse script 41, 43, 45, and 47 to the respective sample portions 40, 42, 44, and 46 as the sample 38, and hence the portions 40, 42, 44, and 46 are stepped moved, for example, in the XY planar direction. The system could also be adapted to move the sample 38 in the Z vertical direction as desired. If the motion control system is a six-axis system, for example, the sample 38 can also be moved or angularly rotated in the pitch (Θ), yaw (φ) and roll (γ) rotations about the X, Y and Z axes, as well in direction along the X, Y, and Z axes. The pulse script of modulated script pulses 50 can be repeated 52 as desired to complete the desired script write process for the respective portions 40, 42, 44, and 46.

Figure 5:
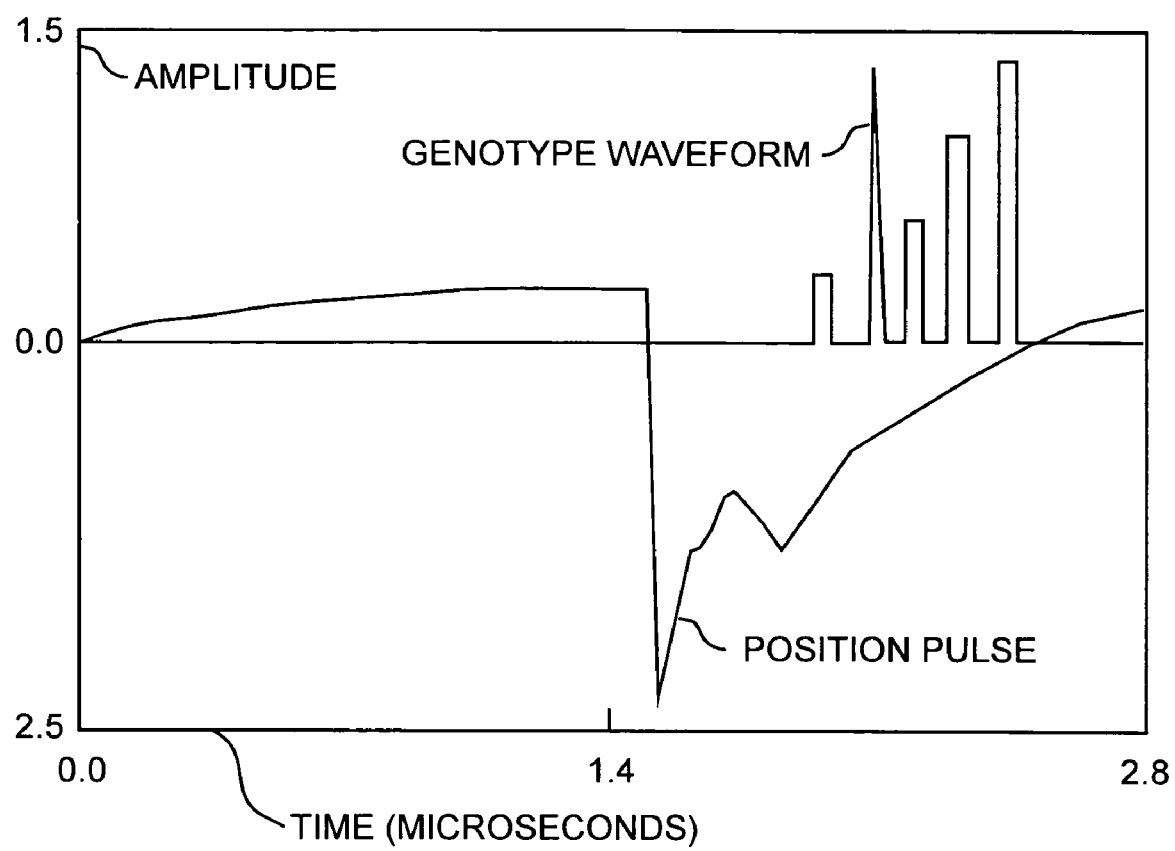
FIG. 5 depicts a genotype waveform.

Referring to all of the Figures, and more particularly to FIGS. 4 and 5, the modulated script pulses are used to perform predetermined scripted laser writing processes including ablation, welding, texturing and dosing. The generated genotype waveforms can be repeated at various locations within a portion of the multimaterial sample 38. The genotype waveform library can be used time and again for various differing samples 38 to be processed. Each of the laser writing processes may be accomplished by one or more genotype waveforms stored in the computer 10 as canned library waveforms that cross references a material or finish and a respective laser writing process to a respective genotype waveform. The genotype waveform can be applied to the laser beam after each pre-specified distance that comprises a multitude of stepper motor steps needed to move the pre-specified distance. The pre-specified distance can be conveniently chosen to be equivalent to the laser spot size on the sample 38. A position pulse may be used to initiate a synchronous motor step. After allowing for some settling of the stepper motor, the genotype waveform can then be applied at a respective XY position, then followed by another pre-specified distance motion step and the exposure of another genotype waveform. In this matter, the genotype waveform generation and stepper motor control occurs concurrently and based upon a selection of genotype waveforms form a predetermined set of library genotype waveforms.

In operation, the system preferably uses computer aided machining (CAM) software executed in the computer 10 that generates and communicates the script file to the waveform generator 20. The script file includes a trigger pulse and a configuration code to trigger and select one of many genotype waveforms in sequence. The waveform generator 20 can be an arbitrary waveform signal generator that is an electronic device used to synthesize electrical signals of arbitrary form. The waveforms are coded into the CAM tool path generator program for generating genotype scripts. The waveform generator 20 generates a unique electrical signal pattern based on the configuration code and this is sent to the power supply 34 for amplifying the electrical waveforms fed to the modulator driver 32. The modulator 28 and polarizer 30 then modulate the polarization of the collimated pulsed laser beam based on the genotype waveforms. The polarization modulated laser beam is converted to an intensity or amplitude modulated laser beam by a cross-polarizer 30 at a fixed orientation placed at the output or in front of the modulated laser beam. Preferably, the modulation is amplitude modulation, but can be any combination of amplitude, wavelength frequency, repetition rate, or polarization using differing modulators 28, lasers 22, and generators 20.

The computer aided machining CAM program converts CAD files into a sequence of precise motion codes that describe the tool path during material processing. The CAM program may be Master CAM software. The CAD program may be a Solid Works CAD software. The motion and position analyzer 12 acts upon the CNC code from the CAM software, and generates the cut-in trigger pulses to signify that a known distance has been traveled in three-dimensional space. This cut-in trigger pulse is fed to the waveform generator 20 that can synthesize an electrical waveform signal of any shape or length by concatenating a sequence of either repeating or nonrepeating preprogrammed signal waveform patterns. These preprogrammed waveform signal patterns can be of arbitrary length. The CAM file precisely instructs a multiple-axis motion controlled platform 13 on each step move and obtains encoder feedback from the position encoder 14 as to the current position in XYZ Cartesian space. As a consequence, the CAM software generates the motion control file for activating the motion and position analyzer 12 for directing the motion system motors, not shown, of the platform 13 by the motion control data. The control data specifies how far the platform 13 has to travel per unit time in Cartesian space as the stepper motors alter the motor torque for changes in the motion pattern. The data preferably provides for lateral movement of the sample 38 in steps. In the CAM software, the motion control file specifies the time and distance to be traveled and motion control is communicated to the platform 13 in the form of electrical pulses that delineates the travel of a unit distance.

The computer 10 can store an arbitrary number of desired electrical waveforms, with each electrical waveform being a genotype waveform of a predetermined sequence of pulses. The outputs of the waveform generator 20 are appropriate genotype waveforms as an electrical signal patterns for each trigger input based on a configuration code so as to drive the modulator 28 and polarizer 30 that generates the corresponding amplitude modulated laser beam. The selection of the appropriate genotype waveform pattern is accomplished through the CAM program executed in the computer 10. The CAM program concurrently articulates the motion of the tool path by generating the motion control file for moving the motion-controlled platform 13 in desired predetermined steps. To successfully perform this operation, a CAM program knows when the modulated laser beam is to cross boundaries of the sample portions 40, 42, 44 and 46, which represent a change in material type or finish. These sample portion boundary changes can be flagged during the CAD to CAM transformation. These software flags can be made available as a configuration code output. As such, the CAM program sends trigger pulses encoded in the motion control file that define the travel of a unit distance and periodically changes the configuration code for concurrently changing the genotype waveform used at the current time of write processing.

Both the script file and the motion control file code are generated concurrently, as stepper motor pulses in the motion control data is communicated to the platform 13, and as the waveform generator trigger and configuration code of the script file are sent to the waveform generator 20. The waveform generator 20 may be a high bandwidth waveform generator that can select one of many genotype waveform patterns from the programmed library resident in the computer 10. The generation and communication of the motion control file and the script file can be done concurrently and on the fly during laser write processing. The concatenated script file of genotype waveform electrical patterns are then used to modulate the laser beam intensity, repetition rate, and color frequency when multiple laser beams are available, and these genotype waveform electrical patterns are synchronized to the motion control data specifying predefined travelling unit steps. In an exemplar form, the modulated laser beam is amplitude modulated at a 5.0 kHz repetition rate with a controlled genotype waveform modulation pattern for every time unit of travel and is equivalent to the laser spot size. The signal amplitude versus time data demonstrates the synchronization between the position-synchronized output (PSO) of the motion and position analyzer 12 and the waveform generator 20 during the laser rastering of a 100 mm×100 mm square pattern. The XY stage velocity can be set to v=400 mm/s and the travel distance for PSO triggering can be set to 1.0 µm.

The system is a control system that ensures that the photon delivery rate is independent of the laser beam motion or the motion of the sample. The system enables controlled photon flux and energy delivery to each precise spot using pulse sequence in number and intensity that is referenced by travel distance and is related to the spot diameter. The feed rate of XYZ position steps can be adjusted on a per tool path segment basis where the laser spot along the path changes in velocity from segment to segment within a portion of the sample. The system enables laser-write processing with velocity independence. The system can be integrated into existing laser processing stations to facilitate significant cost savings in manufacturing of laser-write processes. A genotype waveform can be predetermined by preliminary experimental measurement to determine laser-write process parameters for each type of material and surface finish. Each laser spot receives an equivalent photon dose. The pulse profile specified by the script file can be tailored for a specific material and write process for generating a specific genotype waveform. A sequence of genotype waveforms can be used to respectively process various portions or a multimaterial sample, as well as variegated or heterogeneous materials. As such, the system has application to the genotype scripting for laser material processing using modulated laser beams. The modulated laser beams can be modulated and controlled to ensure that for every irradiated sector down to the dimension of a laser spot size, the delivery rate of the right photon color and number can be guaranteed. The modulated laser beam can have a high repetition rate from kHz to MHz with material removal in small increments to mitigate the effects of laser heating. The system can be adapted for multiple color laser-writing for direct-write microfabrication of microdevices. There are several types of laser writing processes that can be implemented including, percussion and ablative machining, microscale and nanoscale surface texturing, polishing, cleaning, microfusing, crystallization, pulsed laser deposition, and photolithography exposures. Those skilled in the art can make enhancements, improvements, and modifications to the invention, and these enhancements, improvements, and modifications may nonetheless fall within the spirit and scope of the following claims.

What is claimed is:

1. A system for laser write processing a sample, the system comprising,
   a processor for generating a script file of a sequence of waveforms from a predetermined set of waveforms and for generating a motion control file of motion control data for moving the sample during the laser write processing of laser write processes,
   a waveform generator for receiving the script file and generating in sequence the waveforms,
   a platform for supporting and moving the sample during the laser write processes under control of the motion control data, the platform moving under control of the motion control data synchronously with the generation of the sequence of waveforms,
   a laser for generating a laser beam, and
   a modulator for receiving the waveforms and modulating the laser for generating a modulated laser beam exposing the sample during the laser write processing.

2. The system of claim 1 wherein, the processor comprises,
   a computer for generating the script file and the motion control file,
   a motion and position analyzer for generating the motion control data from the motion control file and for generating position defined synchronization signals, the platform moving in synchronous steps with the synchronization signals, the waveform generator receiving the synchronization signals for generating the waveforms synchronously with the moving of the platform in steps.

3. The system of claim 1 wherein the platform further comprises,
   an encoder for encoding positions of the platform and generating encoded position data communicated to the processor for generating the motion control data.

4. The system of claim 1 wherein,
   each of the waveforms have a predetermined number of pulses of varying amplitudes, and
   the modulator modulates the laser beam in modulated pulses having amplitude envelopes defined by the waveforms.

5. The system of claim 1 wherein, the modulator comprises,
   a power supply for translating the waveforms into electrical waveforms,
   a driver for converting the electrical waveforms into a modulation signal, and
   an optical modulator for receiving the modulation signal and for modulating the laser beam into the modulated laser beam.

6. The system of claim 1 wherein, the modulator comprises,
   a power supply for translating the waveforms into electrical waveforms,
   a driver for converting the electrical waveforms into a modulation signal, and
   an optical modulator for receiving the modulation signal and for polarized modulation of the laser beam into the modulated laser beam.

7. The system of claim 1 wherein,
   the sample is a multimaterial sample having multiple portions, and
   differing ones of the waveforms are respectively applied to the portions.

8. The system of claim 1 wherein,
   the motion control data is used to move the platform in steps, and
   each of the waveforms is generated for each of the steps.

9. The system of claim 1 wherein,
   the modulated laser beam is modulated by a modulation selected from the group consisting of pulse amplitude, pulse repetition rate, laser wavelength frequency, and laser beam polarization.

10. The system of claim 1 wherein,
    the platform moves in directions selected from the group consisting of yaw, pitch, roll, x axes, y axes, or z axes.

11. The system of claim 1 wherein,
    the modulated laser beam exposes the sample by a spot size equal to a step size of positional changes after each movement step of the platform.

12. The system of claim 1 wherein,
    the laser write processes are selected from the group consisting of ablation, welding, texturing, and dosing.

* * * * *